(12) United States Patent
Vavelidis et al.

(10) Patent No.: US 7,706,766 B2
(45) Date of Patent: Apr. 27, 2010

(54) METHOD AND SYSTEM FOR A PROGRAMMABLE BIASING MECHANISM FOR A MOBILE DIGITAL TELEVISION ENVIRONMENT

(75) Inventors: Konstantinos Dimitrios Vavelidis, Ilioupolis (GR); Iason Fillipos Vassiliou, Athens (GR)

(73) Assignee: Broadcom Corporation, Irvine, CA (US)

( * ) Notice: Subject to any disclaimer, the term of this patent is extended or adjusted under 35 U.S.C. 154(b) by 1018 days.

(21) Appl. No.: 11/385,081

(22) Filed: Mar. 21, 2006

(65) Prior Publication Data

US 2007/0066271 A1 Mar. 22, 2007

Related U.S. Application Data

(60) Provisional application No. 60/717,915, filed on Sep. 16, 2005, provisional application No. 60/778,232, filed on Mar. 2, 2006.

(51) Int. Cl.
*H04B 1/18* (2006.01)
(52) U.S. Cl. .................. 455/234.1; 455/188.1; 455/254
(58) Field of Classification Search .............. 455/232.1, 455/234.1, 239.1, 241.1, 245.1, 245.2, 254, 455/188.1; 375/316, 343
See application file for complete search history.

(56) References Cited

U.S. PATENT DOCUMENTS 6,670,901 B2 * 12/2003 Brueske et al. ............ 455/232.1
2006/0068740 A1 * 3/2006 Yokoyama ................ 455/234.1

OTHER PUBLICATIONS

Antoine, et al., A Direct-Conversion Receiver for DVB-H, IEEE Journal of Solid-State Circuits, vol. 40, No. 12, Dec. 2005, pp. 2536-2546.
Dawkins, et al., A Single-Chip Tuner for DVB-T, IEEE Journal of Solid-State Circuits, vol. 38, No. 8, Aug. 2003, pp. 1307-1317.
Mobile and Portable DVB-T Radio Access Interface Specification, EICTA, European Industry Association, EICTA/TAC/MBRAI-02-16, pp. 1-46.

* cited by examiner

*Primary Examiner*—Thanh C Le
(74) *Attorney, Agent, or Firm*—McAndrews, Held & Malloy, Ltd.

(57) ABSTRACT

Certain aspects of a method and system for programmable biasing mechanism for a mobile digital television environment are disclosed. Aspects of one method may include controlling a bias of components within each of a plurality of radio frequency (RF) front-ends that comprise low noise amplifiers (LNAs) integrated within a single chip multi-band RF receiver, and of components within each of a plurality of baseband processors integrated within the single chip multi-band RF receiver. The controlling of the bias is based on signal power measurements within the integrated RF front-ends and within the baseband processors, and each of the plurality of RF front-ends handles processing of at least one of: a received UHF signal and a received L-band signal.

26 Claims, 9 Drawing Sheets

METHOD AND SYSTEM FOR A PROGRAMMABLE BIASING MECHANISM FOR A MOBILE DIGITAL TELEVISION ENVIRONMENT

CROSS-REFERENCE TO RELATED APPLICATIONS/INCORPORATION BY REFERENCE

This application make reference to, claims priority to, and claims the benefit of:

U.S. Provisional Application Ser. No. 60/717,915 filed on Sep. 16, 2005; and

U.S. Provisional Application Ser. No. 60/778,232 filed on Mar. 2, 2006.

This application also makes reference to:

U.S. patent application Ser. No. 11/385,390 filed on even date herewith;

U.S. patent application Ser. No. 11/385,423 filed on even date herewith;

U.S. patent application Ser. No. 11/385,389 filed on even date herewith;

U.S. patent application Ser. No. 11/385,401 filed on even date herewith; and

U.S. patent application Ser. No. 11/385,101 filed on even date herewith.

Each of the above stated applications is hereby incorporated herein by reference in its entirety.

FIELD OF THE INVENTION

Certain embodiments of the invention relate to multiband RF chips. More specifically, certain embodiments of the invention relate to a method and system for a programmable biasing mechanism for a mobile digital television environment.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS).

Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The OFDM spread spectrum technique may be utilized to distribute information over many carriers that are spaced apart at specified frequencies. The OFDM technique may also be referred to as multi-carrier or discrete multi-tone modulation. This technique may result in spectral efficiency and lower multi-path distortion, for example. The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area single frequency network (SFN). There are also significant challenges in deploying broadcast services to mobile user equipment. Because of form factor constraints, many handheld portable devices, for example, may require that PCB area be minimized and that services consume minimum power to extend battery life to a level that may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H). The broadcasting frequencies for Europe are in UHF (bands IV/V) and in the US, the 1670-1675 MHz band that has been allocated for DVB-H operation. Additional spectrum is expected to be allocated in the L-band world-wide.

To meet requirements for mobile broadcasting the DVB-H specification supports time slicing to reduce power consumption at the user equipment, addition of a 4K mode to enable network operators to make tradeoffs between the advantages of the 2K mode and those of the 8K mode, and an additional level of forward error correction on multi-protocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM).

While several adaptations have been made to provide support for mobile broadcast capabilities in DVB-T, concerns regarding device size, cost, and/or power requirements still remain significant constraints for the implementation of handheld portable devices enabled for digital video broadcasting operations. For example, typical DVB-T tuners or receivers in mobile terminals may employ super-heterodyne architectures with one or two intermediate frequency (IF) stages and direct sampling of the passband signal for digital quadrature down-conversion. Moreover, external tracking and SAW filters may generally be utilized for channel selection and image rejection. Such approaches may result in increased power consumption and high external component count, which may limit their application in handheld portable devices. As a result, the success of mobile broadcast capability of DVB-T may depend in part on the ability to develop TV tuners that have smaller form factor, are produced at lower cost, and consume less power during operation.

In the presence of large blocker signals, the gain of the low noise amplifier (LNA) mixers, and other components of the receiver have to be very linear or the output has to have a linear relationship with the input to maintain the performance of the receiver. This causes increased power consumption by the receiver due to the highly linear characteristics of various components in the receiver. Blocker signals are unwanted signals in frequency channels outside the wanted channel that disturb the reception of the wanted signals. This happens due to the fact that the blockers generate large signals within the receiver path. These large signals may introduce harmonics and intermodulation products or unwanted mixing products that crosstalk with the wanted signals. Similarly, when the required RF signal is weak, there is an increase in the power consumption of the receiver to achieve a good noise factor (NF) and a good phase noise. In handheld communication devices such as cell phones, and smart phones, the increased power consumption may significantly drain the battery that powers these devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a programmable biasing mechanism for a mobile digital television environment, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a programmable biasing mechanism for a mobile digital television environment. A single-chip multi-band radio frequency (RF) receiver in a mobile terminal may comprise ultra-high frequency (UHF) and L-band front-ends. The bias of the components within each of a plurality of radio frequency (RF) front-ends that comprise low noise amplifiers (LNAs) integrated within a single chip multi-band RF receiver, and of components within each of a plurality of analog baseband processors integrated within the single chip multi-band RF receiver may be controlled. The controlling of the bias is based on signal power measurements within the integrated RF front-ends and within the analog baseband processors, and each of the plurality of RF front-ends handles processing of at least one of a received RF signal.

Figure 1A:
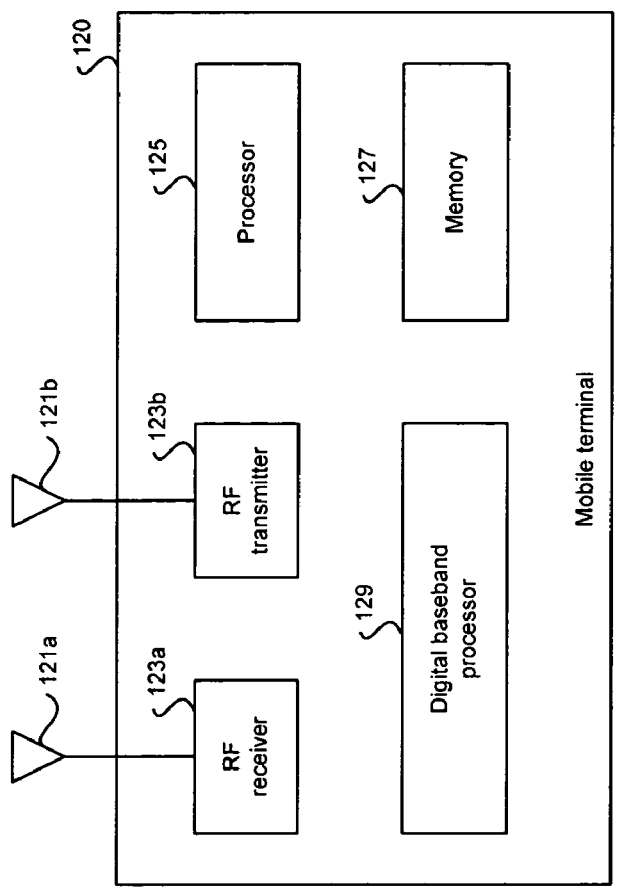
FIG. 1A is a block diagram illustrating an exemplary mobile terminal, in accordance with an embodiment of the invention.

FIG. 1A is a block diagram illustrating an exemplary mobile terminal, in accordance with an embodiment of the invention. Referring to FIG. 1A, there is shown a mobile terminal 120 that may comprise an RF receiver 123*a*, an RF transmitter 123*b*, a digital baseband processor 129, a processor 125, and a memory 127. A receive antenna 121*a* may be communicatively coupled to the RF receiver 123*a*. A transmit antenna 121*b* may be communicatively coupled to the RF transmitter 123*b*. U.S. application Ser. No. 11/385,390 filed on even date herewith, provides a detailed description of a the cellular network and/or digital video broadcast network in which the mobile terminal 120 may communicate, and is hereby incorporated by reference in its entirety.

The RF receiver 123a may comprise suitable logic, circuitry, and/or code that may enable processing of received RF signals. The RF receiver 123a may enable receiving RF signals in a plurality of frequency bands. For example, the RF receiver 123a may enable receiving DVB-H transmission signals via the UHF band, from about 470 MHz to about 890 MHz, the 1670-1675 MHz band, and/or the L-band, from about 1400 MHz to about 1700 MHz, for example. Moreover, the RF receiver 123a may enable receiving signals in cellular frequency bands, for example. Each frequency band supported by the RF receiver 123a may have a corresponding front-end circuit for handling low noise amplification and down conversion operations, for example. In this regard, the RF receiver 123a may be referred to as a multi-band receiver when it supports more than one frequency band. In another embodiment of the invention, the mobile terminal 120 may comprise more than one RF receiver 123a, wherein each of the RF receiver 123a may be a single-band or a multi-band receiver.

The RF receiver 123a may quadrature down convert the received RF signal to a baseband frequency signal that comprises an in-phase (I) component and a quadrature (Q) component. The RF receiver 123a may perform direct down conversion of the received RF signal to a baseband frequency signal, for example. In some instances, the RF receiver 123a may enable analog-to-digital conversion of the baseband signal components before transferring the components to the digital baseband processor 129. In other instances, the RF receiver 123a may transfer the baseband signal components in analog form.

The digital baseband processor 129 may comprise suitable logic, circuitry, and/or code that may enable processing and/or handling of baseband frequency signals. In this regard, the digital baseband processor 129 may process or handle signals received from the RF receiver 123a and/or signals to be transferred to the RF transmitter 123b, when the RF transmitter 123b is present, for transmission to the network. The digital baseband processor 129 may also provide control and/or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network.

The RF transmitter 123b may comprise suitable logic, circuitry, and/or code that may enable processing of RF signals for transmission. The RF transmitter 123b may enable transmission of RF signals in a plurality of frequency bands. Moreover, the RF transmitter 123b may enable transmitting signals in cellular frequency bands, for example. Each frequency band supported by the RF transmitter 123b may have a corresponding front-end circuit for handling amplification and up conversion operations, for example. In this regard, the RF transmitter 123b may be referred to as a multi-band transmitter when it supports more than one frequency band. In another embodiment of the invention, the mobile terminal 120 may comprise more than one RF transmitter 123b, wherein each of the RF transmitter 123b may be a single-band or a multi-band transmitter.

The RF transmitter 123b may quadrature up convert the baseband frequency signal comprising I/Q components to an RF signal. The RF transmitter 123b may perform direct up conversion of the baseband frequency signal to a baseband frequency signal, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, and/or code that may enable control and/or data processing operations for the mobile terminal 120. The processor 125 may be utilized to control at least a portion of the RF receiver 123a, the RF transmitter 123b, the digital baseband processor 129, and/or the memory 127. In this regard, the processor 125 may generate at least one signal for controlling operations within the mobile terminal 120. The processor 125 may also enable executing of applications that may be utilized by the mobile terminal 120. For example, the processor 125 may execute applications that may enable displaying and/or interacting with content received via DVB-H transmission signals in the mobile terminal 120.

The memory 127 may comprise suitable logic, circuitry, and/or code that may enable storage of data and/or other information utilized by the mobile terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the mobile terminal 120. For example, the memory 127 may comprise information necessary to configure the RF receiver 123a to enable receiving DVB-H transmission in the appropriate frequency band.

Figure 1B:
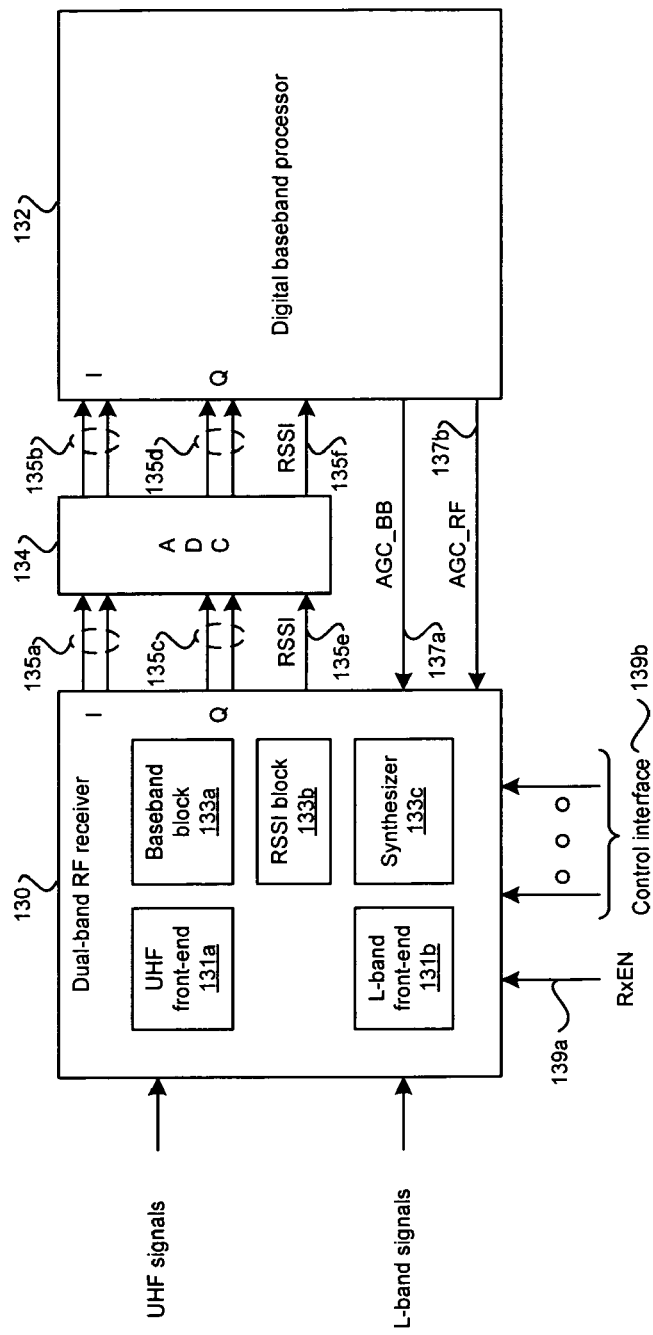
FIG. 1B is a block diagram illustrating exemplary communication between a dual-band RF receiver and a digital baseband processor in a mobile terminal, in accordance with an embodiment of the invention.

FIG. 1B is a block diagram illustrating exemplary communication between a dual-band RF receiver and a digital baseband processor in a mobile terminal, in accordance with an embodiment of the invention. Referring to FIG. 1B, there is shown a dual-band RF receiver 130, an analog-to-digital converter (ADC) 134, and a digital baseband processor 132. The dual-band RF receiver 130 may comprise a UHF front-end 131a, an L-band front-end 131b, a baseband block 133a, a received signal strength indicator (RSSI) block 133b, and a synthesizer 133c. The dual-band RF receiver 130, the analog-to-digital converter (ADC) 134, and/or the digital baseband processor 132 may be part of a mobile terminal, such as the mobile terminal 120 in FIG. 1A, for example.

The dual-band RF receiver 130 may comprise suitable logic, circuitry, and/or code that may enable handling of UHF and L-band signals. The dual-band RF receiver 130 may be enabled via an enable signal, such as the signal RxEN 139a, for example. In this regard, enabling the dual-band RF receiver 130 via the signal RxEN 139a by a 1:10 ON/OFF ratio may allow time slicing in DVB-H while reducing power consumption. At least a portion of the circuitry within the dual-band RF receiver 130 may be controlled via the control interface 139b. The control interface 139b may receive information from, for example, a processor, such as the processor 125 in FIG. 1A, or from the digital baseband processor 132. The control interface 139b may comprise more than one bit. For example, when implemented as a 2-bit interface, the control interface 139a may be an inter-integrated circuit (12C) interface.

The UHF front-end 131a may comprise suitable logic, circuitry, and/or code that may enable low noise amplification and direct down conversion of UHF signals. In this regard, the UHF front-end 131a may utilize an integrated low noise amplifier (LNA) and mixers, such as passive mixers, for example. The UHF front-end 131*a* may communicate the resulting baseband frequency signals to the baseband block 133*a* for further processing.

The L-band front-end 131*b* may comprise suitable logic, circuitry, and/or code that may enable low noise amplification and direct down conversion of L-band signals. In this regard, the L-band front-end 131*b* may utilize an integrated LNA and mixers, such as passive mixers, for example. The L-band front-end 131*b* may communicate the resulting baseband frequency signals to the baseband block 133*a* for further processing. The dual-band RF receiver 130 may enable one of the UHF front-end 131*a* and the L-band front-end 131*b* based on current communication conditions.

The synthesizer 133*c* may comprise suitable logic, circuitry, and/or code that may enable generating the appropriate local oscillator (LO) signal for performing direct down conversion in either the UHF front-end 131*a* or the L-band front-end 131*b*. Since the synthesizer 133*c* may enable fractional division of a source frequency when generating the LO signal, a large range of crystal oscillators may be utilized as a frequency source for the synthesizer 133*c*. This approach may enable the use of an existing crystal oscillator in a mobile terminal PCB, thus reducing the number of external components necessary to support the operations of the dual-band RF receiver 130, for example. The synthesizer 133 may generate a common LO signal for the UHF front-end 131*a* and for the L-band front-end 131*b*. In this regard, the UHF front-end 131*a* and the L-band front-end 131*b* may enable dividing the LO signal in order to generate the appropriate signal to perform down conversion from the UHF band and from the L-band respectively. In some instances, the synthesizer 133 may have at least one integrated voltage controlled oscillator (VCO) for generating the LO signal. In other instances, the VCO may be implemented outside the synthesizer 133.

The baseband block 133*a* may comprise suitable logic, circuitry, and/or code that may enable processing of I/Q components generated from the direct down conversion operations in the UHF front-end 131*a* and the L-band front-end 131*b*. The baseband block 133*a* may enable amplification and/or filtering of the I/Q components in analog form. The baseband block 133*a* may communicate the processed I component, that is, signal 135*a*, and the processed Q component, that is, signal 135*c*, to the ADC 134 for digital conversion.

The RSSI block 133*b* may comprise suitable logic, circuitry, and/or code that may enable measuring the strength, that is, the RSSI value, of a received RF signal, whether UHF or L-band signal. The RSSI measurement may be performed, for example, after the received RF signal is amplified in either the UHF front-end 131*a* or the L-band front-end 131*b*. The RSSI block 133*b* may communicate the analog RSSI measurement, that is, signal 135*e*, to the ADC 134 for digital conversion.

The ADC 134 may comprise suitable logic, circuitry, and/or code that may enable digital conversion of signals 135*a*, 135*c*, and/or 135*e* to signals 135*b*, 135*d*, and/or 135*f* respectively. In some instances, the ADC 134 may be integrated into the dual-band RF receiver 130 or into the digital baseband processor 132.

The digital baseband processor 132 may comprise suitable logic, circuitry, and/or code that may enable processing and/or handling of baseband frequency signals. In this regard, the digital baseband processor 132 may be the same or substantially similar to the digital baseband processor 129 described in FIG. 1A. The digital baseband processor 132 may enable generating at least one signal, such as the signals AGC_BB 137*a* and AGC_RF 137*b*, for adjusting the operations of the dual-band RF receiver 130. For example, the signal AGC_BB 137*a* may be utilized to adjust the gain provided by the baseband block 133*a* on the baseband frequency signals generated from either the UHF front-end 131*a* or the L-band front-end 131*b*. In another example, the signal AGC_RF 137*b* may be utilized to adjust the gain provided by an integrated LNA in either the UHF front-end 131*a* or the L-band front-end 131*b*. In another example, the digital baseband processor 132 may generate at least one control signal or control information communicated to the dual-band RF receiver 130 via the control interface 139*b* for adjusting operations within the dual-band RF receiver 130.

Figure 1C:
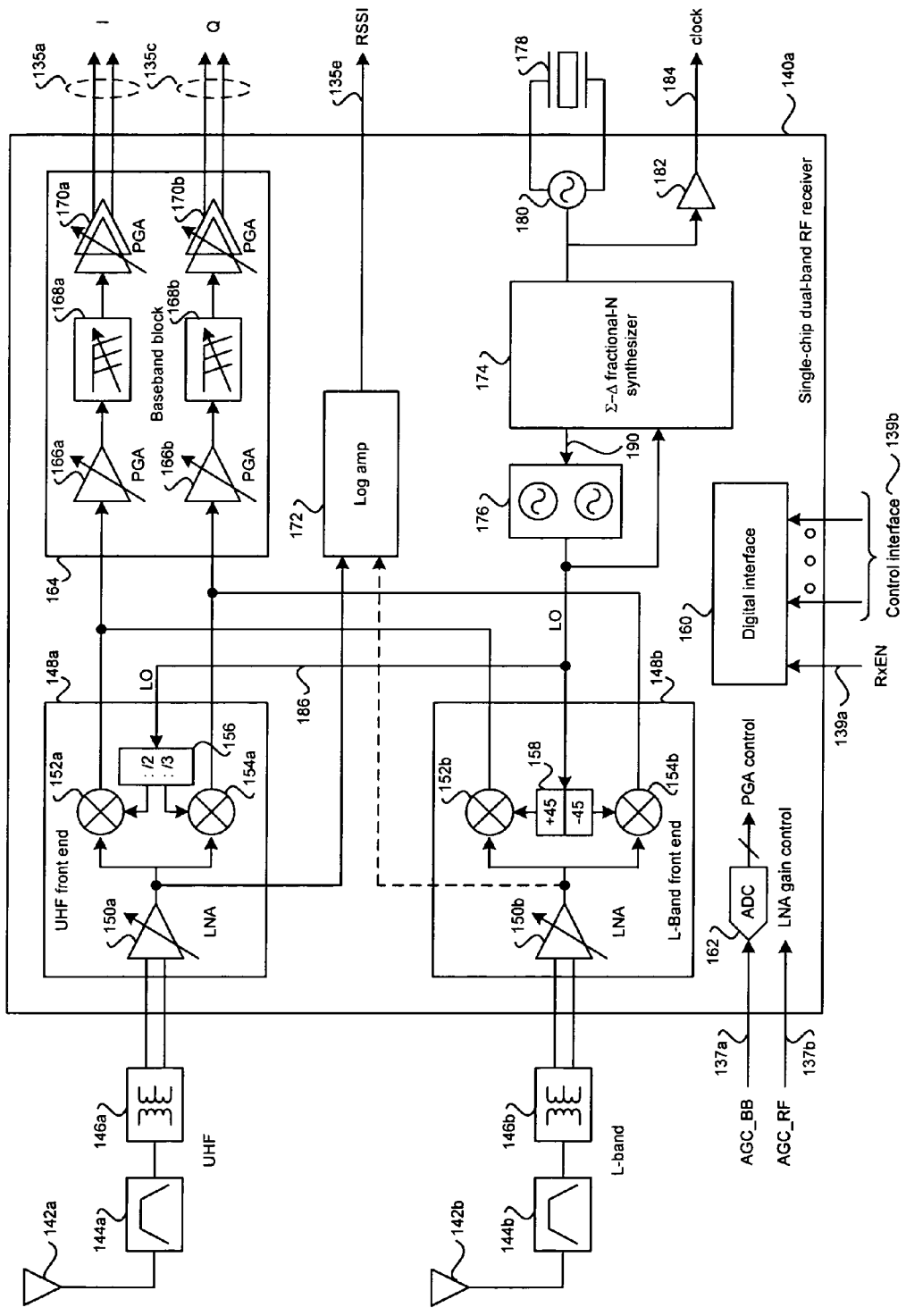
FIG. 1C is a block diagram illustrating an exemplary single-chip dual-band RF receiver with an integrated LNA in each front-end, in accordance with an embodiment of the invention.

FIG. 1C is a block diagram illustrating an exemplary single-chip dual-band RF receiver with an integrated LNA in each front-end, in accordance with an embodiment of the invention. Referring to FIG. 1C, there is shown a single-chip dual-band RF receiver 140*a* that may comprise a UHF front-end 148*a*, an L-band front-end 148*b*, a baseband block 164, a logarithmic amplifier (logarithmic amplifier) 172, a Σ-Δ fractional-N synthesizer 174, a VCO block 176, a digital interface 160, an ADC 162, an oscillator 180, and a buffer 182.

The single-chip dual-band RF receiver 140*a* may be fabricated using any of a plurality of semiconductor manufacturing processes, for example, complimentary metal-oxide-semiconductor (CMOS) processes, bipolar CMOS (BiCMOS), or Silicon Germanium (SiGe). The single-chip dual-band RF receiver 140*a* may be implemented using differential structures to minimize noise effects and/or substrate coupling, for example. The single-chip dual-band RF receiver 140*a* may utilize low drop out (LDO) voltage regulators to regulate and clean up on-chip voltage supplies. In this regard, the LDO voltage regulators may be utilized to transform external voltage sources to the appropriate on-chip voltages.

When the single-chip dual-band RF receiver 140*a* is implemented utilizing a CMOS process, some design considerations may include achieving low noise figure (NF) values, wide-band operation, high signal-to-noise ration (SNR), performing DC offset removal, achieving high input second-order and third-order intercept points (IIP2 and IIP3), and/or reducing I/Q mismatch, for example.

The single-chip dual-band RF receiver 140*a* may receive UHF signals via a first antenna 142*a*, a UHF filter 144*a*, and a first balun 146*a*. The UHF filter 144*a* enables band pass filtering, wherein the band pass may be about 470 to about 702 MHz for cellular signals, for example, or about 470 to about 862 MHz, for other types of received signals, for example. The balun 146*a* enables balancing the filtered signals before being communicated to the UHF front-end 148*a*.

The single-chip dual-band RF receiver 140*a* may receive L-band signals via a second antenna 142*b*, an L-band filter 144*b*, and a second balun 146*b*. The L-band filter 144*b* enables band pass filtering, wherein the band pass may be about 1670 to about 1675 MHz for signals in US systems, for example, or about 1450 to about 1490 MHz, for signals in European systems, for example. The balun 146*b* enables balancing the filtered signals before being communicated to the L-band front-end 148*a*. In some instances, antennas 142*a* and 142*b* may be implemented utilizing a single antenna communicatively coupled to the single-chip dual-band RF receiver 140*a* that may support receiving radio signals operating in the UHF IV/V and/or L-band, for example.

The UHF front-end 148*a* may comprise a variable low noise amplifier (LNA) 150*a*, a mixer 152*a*, a mixer 154*a*, and a LO signal divider 156. The variable LNA 150*a* may comprise suitable logic and/or circuitry that may enable amplification of the UHF signals received. Matching between the output of the balun 146*a* and the input of the variable LNA 150*a* may be achieved by utilizing off-chip series inductors, for example. The variable LNA 150a may implement continuous gain control by current steering that may be controlled by a replica scheme within the variable LNA 150a. The gain of the variable LNA 150a may be adjusted via the signal AGC_RF 137b, for example.

The mixers 152a and 154a may comprise suitable logic and/or circuitry that may enable generating in-phase (I) and quadrature (Q) components of the baseband frequency signal based on direct down conversion of the amplified received UHF signal with the quadrature signals 186I and 186Q generated by the divider block 156. The mixers 152a and 154a may be passive mixers in order to achieve high linearity and/or low flicker noise, for example. The LO signal divider 156 may comprise suitable logic, circuitry, and/or code that may enable dividing of the LO signal 186 by a factor of 2 (:/2) or a factor of 3 (:/3) and at the same time provide quadrature outputs 186I and 186Q, wherein 186I and 186Q have 90 degrees separation between them. The factor of 3 division may be used when the received UHF signal band is about 470 to about 600 MHz, for example. The factor of 2 division may be used when the received UHF signal band is about 600 to about 900 MHz, for example. The I/Q components generated by the mixers 152a and 154a may be communicated to the baseband block 164.

The L-band front-end 148b may comprise a variable LNA 150b, a mixer 152a, a mixer 154a, and a LO signal generator 158. The variable LNA 150a may comprise suitable logic and/or circuitry that may enable amplification of the L-band signals received. Matching between the output of the balun 146b and the input of the variable LNA 150b may be achieved by utilizing off-chip series inductors, for example. The variable LNA 150b may implement continuous gain control by current steering that may be controlled by a replica scheme within the variable LNA 150b. The gain of the variable LNA 150b may be adjusted via the signal AGC_RF 137b, for example.

The mixers 152b and 154b may comprise suitable logic and/or circuitry that may enable generating I/Q components of the baseband frequency signal based on the direct down conversion of the amplified received L-band signal with the LO signals 158I and 158Q generated by the LO generator block 158. The mixers 152b and 154b may be passive mixers in order to achieve high linearity and/or low flicker noise, for example. The LO signal generator 158 may comprise suitable logic, circuitry, and/or code that may enable generation of quadrature LO signals 158I and 158Q, that is, signals with 90 degree phase split between them, from the LO signal 186. The I/Q components generated by the mixers 152b and 154b may be communicated to the baseband block 164.

The logarithmic amplifier 172 may comprise suitable logic, circuitry, and/or code that may enable generation of a wideband, received signal strength indicator (RSSI) signal, such as the signal 135e, based on the output of the variable LNA 150a. The RSSI signal indicates the total amount of signal power that is present at the output of the LNA, for example. The RSSI signal may be utilized by, for example, the digital baseband processor 132 in FIG. 1B, to adjust the gain of the variable LNA 150a in the presence of RF interference to achieve NF and/or linearity performance that meets blocking and/or intermodulation specifications, for example. In this regard, interference may refer to blocker signals, for example. Blocker signals may be unwanted signals in frequency channels outside the wanted or desired channel that may disturb the reception of the wanted signals. This effect may be a result of blockers generating large signals within the receiver path. These large signals may introduce harmonics, intermodulation products, and/or unwanted mixing products that crosstalk with the wanted signals. In another embodiment of the invention, the logarithmic amplifier 172 may enable generating a wideband, RSSI signal, such as the signal 135e, based on the output of the variable LNA 150b. In this instance, the RSSI signal may be utilized by to adjust the gain of the variable LNA 150b.

The baseband block 164 may comprise an in-phase component processing path and a quadrature component processing path. The in-phase processing path may comprise at least one programmable gain amplifier (PGA) 166a, a baseband filter 168a, and at least one PGA 170a. The quadrature component processing path may comprise at least one PGA 166b, a baseband filter 168b, and at least one PGA 170b. The PGAs 166a, 166b, 170a, and 170b may comprise suitable logic, circuitry, and/or code that may enable amplification of the down converted components of the baseband frequency signal generated by the RF front-end. The gain of the PGAs 166a, 166b, 170a, and 170b may be digitally programmable. In addition, at the output of the PGAs 166a and 166b, a programmable pole may be utilized to reduce linearity requirements for the baseband filters 168a and 168b respectively. Since the static and time-varying DC offset may saturate the operation of the single-chip dual-band RF receiver 140a, the PGAs 166a, 166b, 170a, and 170b may utilize DC servo loops to address DC offset issues. The gain of the PGAs 166a, 166b, 170a, and/or 170b may be controlled via the AGC_BB signal 137a, for example. In this regard, the ADC 162 may be utilized to provide digital control of the PGAs 166a, 166b, 170a, and/or 170b when the AGC_BB signal 137a is an analog signal.

The baseband filters 168a and 168b may comprise suitable logic, circuitry, and/or code that may enable channel selection, for example. Channel selection may be performed by filters, such as an $N^{th}$ order lowpass Chebyschev filter implemented by active integrators in a leapfrog configuration, for example. For the correct tuning of the characteristics of the filters, an on-chip auto-calibration loop may be activated upon power-up. The auto-calibration loop may set up the corner frequency to the correct vale required to meet the requirements of the communications standard for which the receiver is designed. For DVB-T/DVB-H, the value $f_o$ of the filter response may be set to a value from 2 to 5 MHz thus supporting the different channel bandwidths of 5-8 MHz specified by DVB-T/DVB-H standards. During auto-calibration, a tone at the appropriate $f_{-3dB}$ may be generated on-chip and may be applied at the input of the baseband filters 168a and 168b for comparison with the filter output of a root-mean-squared (RMS) detector. A digitally controlled loop may be utilized to adjust the baseband filter bandwidth until the output of the baseband filter and the RMS detector are the same.

The $\Sigma$-$\Delta$ fractional-N synthesizer 174 may comprise suitable logic, circuitry, and/or code that may enable LO generation that may be independent of the reference crystal frequency, such as the crystal 178, for example. In this regard, the synthesizer 174 may generate a signal, such as the signal 190, for example, to control the operation of the VCO block 176 and therefore the generation of the LO signal 186. Since the synthesizer 174 may enable fractional synthesis, the single-chip dual band RF receiver 140a may utilize the same crystal utilized by other operations in the mobile terminal while maintaining fine tuning capability. The synthesizer 174 may receive a reference frequency signal from the crystal 178 via an oscillator 180, for example. The output of the oscillator 180 may also be buffered by the buffer 182 to generate a clock signal 184, for example.

The VCO block 176 may comprise suitable logic, circuitry, and/or code that may enable generating the LO signal 186 utilized by the UHF front-end 148a and the L-band front-end 148b for direct down conversion of the received RF signals. The VCO block 176 may comprise at least one VCO, wherein each VCO may have cross-coupled NMOS and PMOS devices and metal-oxide-semiconductor (MOS) varactors in an accumulation mode for tuning. In this regard, a switched varactor bank may be utilized for providing coarse tuning. The VCO block 176 may provide a range of about 1.2 to about 1.8 GHz when implemented utilizing two VCOs, for example. When more than one VCO is utilized in implementing the VCO block 176, selecting the proper VCO for generating the LO signal 186 may be based on the type of RF signal being received by the single-chip dual band RF receiver 140a.

The digital interface 160 may comprise suitable logic, circuitry, and/or code that may enable controlling circuitry within the single-chip dual band RF receiver 140a. The digital interface 160 may comprise a plurality of registers for storing control and/or operational information for use by the single-chip dual-band RF receiver 140a. The digital interface 160 may enable receiving the signal RxEN 139a that may be utilized to perform 1:10 ON/OFF ratio time slicing in DVB-H while reducing power consumption. Moreover, the digital interface 160 may enable receiving the control interface 139b from, for example, a processor, such as the processor 125 in FIG. 1A, or from the digital baseband processor 132 in FIG. 1B. The control interface 139b may comprise more than one bit. The control interface 139b may be utilized to control the synthesis operations of the synthesizer 174 and/or the filtering operations of the baseband filters 168a and 168b. The control interface 139b may also be utilized to adjust the bias of circuits within the single-chip dual-band RF receiver 140a, such as those of the variable LNAs 150a and 150b, the PGAs 166a, 166b, 170a, and 170b, and/or the baseband filters 168a and 168b, for example.

Figure 2A:
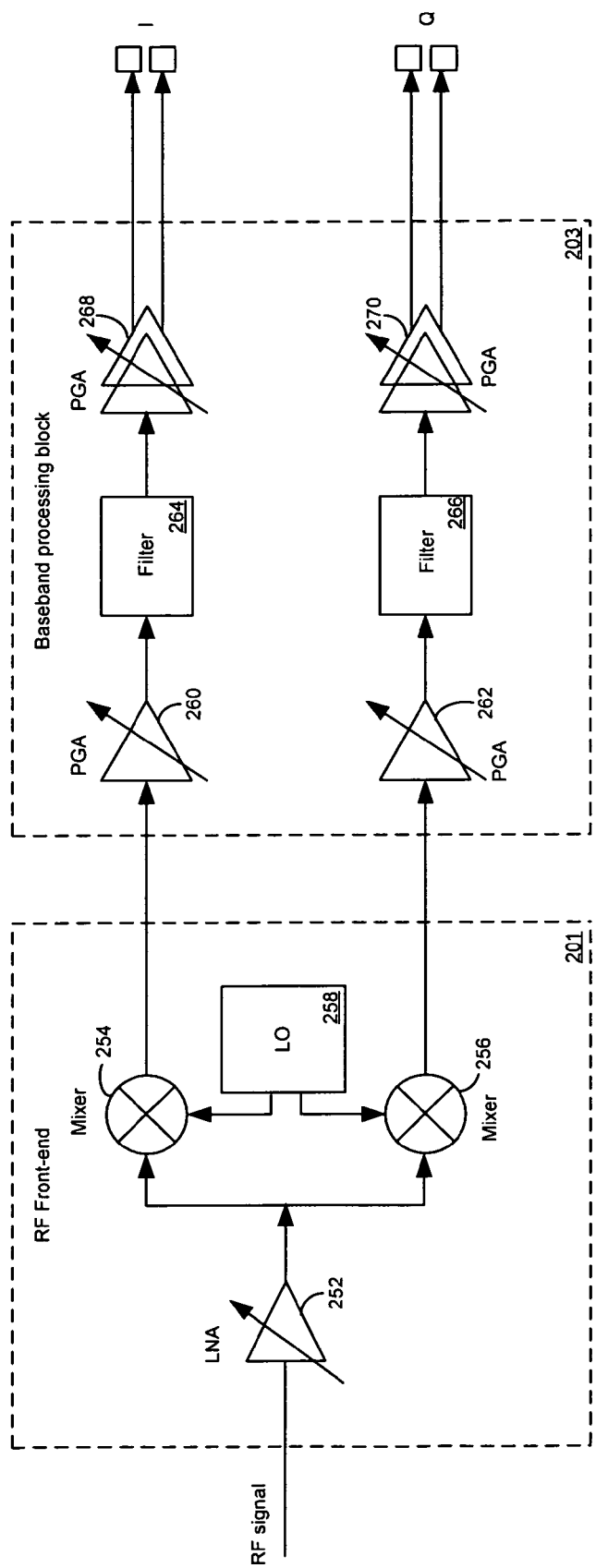
FIG. 2A is a block diagram of a RF front end system, in accordance with an embodiment of the invention.

FIG. 2A is a block diagram of a RF front-end system, in accordance with an embodiment of the invention. Referring to FIG. 2A, there is shown a RF front-end block 201 and a baseband processing block 203. The RF front-end block 201 comprises a variable low noise amplifier (LNA) 252, two mixers, 254 and 256 for the in-phase (I) and the quadrature (Q) paths of the RF signal, and a local oscillator synthesis block 258. The baseband processing block 203 comprises the in-phase (I) and the quadrature (Q) processing paths of the signal, comprising of a plurality of programmable gain amplifiers (PGA) 260, 262, 268, and 270, and a plurality of filters 264 and 266.

The variable LNA 252 may comprise suitable logic and/or circuitry that may enable amplification of a plurality of RF signals, for example, UHF or L-band signals received. The variable LNA 252 may implement continuous gain control by current steering that may be controlled by a replica scheme within the variable LNA 252. The mixers 254 and 256 may comprise suitable logic and/or circuitry that may enable generating in-phase (I) and quadrature (Q) components of the baseband frequency signal based on direct down conversion of the amplified received RF signal with a LO signal generated by the local oscillator 258. The mixers 254 and 256 may be passive mixers, which may achieve high linearity and/or low flicker noise, for example. The I/Q components generated by the mixers 254 and 256 may be communicated to the baseband processing block 203. In the presence of a blocking signal, the gain of the LNA 252 must be linear, which may increase the power consumption.

The baseband processing block 203 may comprise an in-phase (I) component processing path comprising a plurality of programmable gain amplifiers (PGA) 260 and 268, and a baseband filter 264, and a quadrature (Q) component processing path comprising a plurality of programmable gain amplifiers (PGA) 262 and 270, and a baseband filter 266. The PGAs 260, 262, 268, and 270 may comprise suitable logic, circuitry, and/or code that may enable amplification of the down converted components of the baseband frequency signal generated by the RF front-end. In the presence of a blocking signal, due to the highly linear characteristics of various RF cells, the power consumption may increase.

The baseband filters 264 and 266 may comprise suitable logic, circuitry, and/or code that may enable channel selection, for example. Channel selection may be performed by a filter, such as an $N^{th}$ order Chebyschev filter implemented by active integrators in a leapfrog configuration, for example. For the correct tuning of the characteristics of the filters, an on-chip auto-calibration loop may be activated upon power-up. The auto-calibration loop may set up the corner frequency to the correct value required to meet the requirements of the communications standard for which the receiver was designed. For DVB-T/DVB-H for example, the $f_o$ of the filter response can be set to a value from 2.5 to 4 MHz, thus supporting the different channel bandwidths of 5-8 MHz specified by DVB-T/DVB-H standards. During auto-calibration, a tone at the appropriate $f_{-3dB}$ may be generated on-chip and may be applied at the input of the baseband filters 264 and 266 for comparison with the filter output of a root-mean-squared (RMS) detector. A digitally controlled loop may be utilized to adjust the baseband filter bandwidth until the output of the baseband filter and the RMS detector are the same.

Figure 2B:
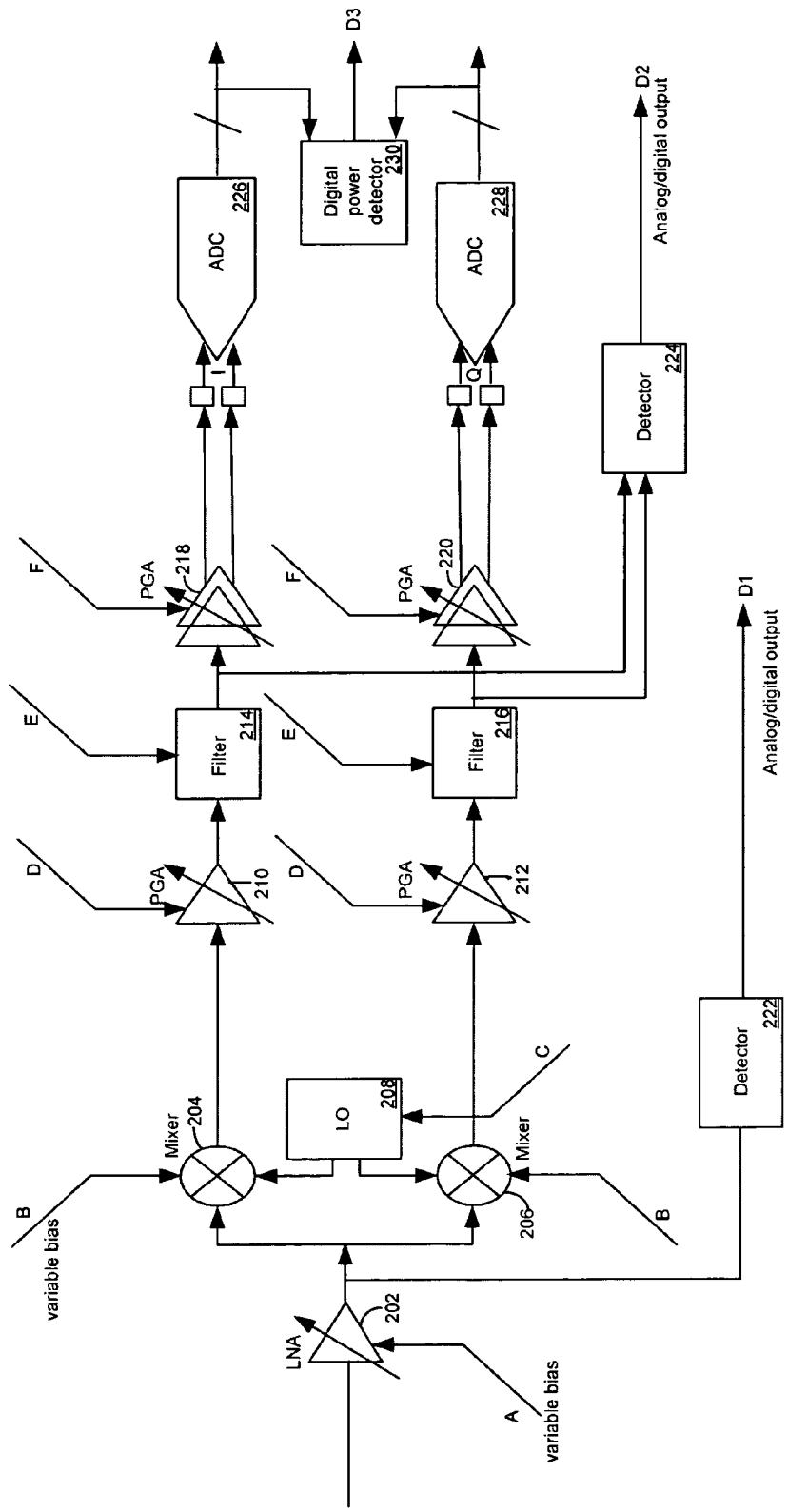
FIG. 2B is a block diagram illustrating additions to FIG. 2A that enable a programmable biasing mechanism for a mobile digital television environment, in accordance with an embodiment of the invention.

FIG. 2B is a block diagram illustrating additions to FIG. 2A that enable a programmable biasing mechanism for a mobile digital television environment, in accordance with an embodiment of the invention. Referring to FIG. 2B, there is shown a variable low noise amplifier with variable bias (LNA) 202, a plurality of mixers with variable bias 204 and 206, a local oscillator with variable bias 208, a plurality of programmable gain amplifiers (PGA) with variable bias 210, 212, 218, and 220, a plurality of filters with variable bias 214 and 216, a plurality of analog to digital converters (ADC) 226 and 228, a digital power detector 230, and a plurality of power detectors, 222 and 224.

The blocks in FIG. 2B may be substantially as described in FIG. 2A. Each of the cells in the RF front-end system may be controlled by programmable biasing mechanism. The programmable bias may be controlled using either an analog biasing configuration mechanism or a digital biasing configuration mechanism. The plurality of ADCs 226 and 228 may comprise suitable logic, circuitry, and/or code that may enable conversion of the analog I and Q components of the baseband frequency signal to digital signals. The ADCs 226 and 228 may be the same ADCs as the block 134 in FIG. 1B. The received UHF signal and the received L-band signal may be directly converted to a baseband signal within the single chip multi-band RF receiver 140a. The digital power detector 230 may comprise suitable logic, circuitry, and/or code that may enable measuring the signal strength of said converted baseband signal or the received signal strength of the I and Q components of the baseband frequency signal.

The detector 222 may comprise suitable logic, circuitry, and/or code that may enable measuring within the single chip multi-band RF receiver 140a, RF signal power at an output of each of the LNAs 202 in each of the plurality of RF front-ends 201. The detector 222 may be implemented as a logarithmic amplifier 172, as in FIG. 1C. The input of detector 222 alternatively may be connected at the input of the RF front end, which is the input of the LNA 202 or the output of the mixers 204, 206 or multiple detectors with the same functionality may be connected at least some of the above possible inputs or outputs. The presence of a strong signal, which may be a blocker signal, may be determined based on the RF power measurement at the output of the LNA with variable bias 202 or at the RF power measurement before the LNA 202 if a detector is connected at the input of the LNA 202 or at the output of the mixers 204 and 206 if a detector is connected after the mixers 204 and 206. Blocker signals are unwanted signals in frequency channels outside the wanted channel that disturb the reception of the wanted signals. This happens due to the fact that the blockers generate large signals within the receiver path. These large signals may introduce harmonics and intermodulation products or unwanted mixing products that crosstalk with the wanted signals. The detector 224 may comprise suitable logic, circuitry, and/or code that may enable measuring within the single chip multi-band RF receiver 140a, the signal power of either the I or the Q baseband signal paths or both. The detector 224 may generate a signal D2 which is proportional to the power of the baseband frequency signals I and Q, which is the signal power at the outputs of the filters with variable bias 214 and 216, and the input of the PGAs with variable bias, 218 and 220. The difference between detector 222 which produces the output D1 or a detector connected at the input of the LNA 202 or a detector connected at the output of the mixers 204 and 206 and detectors 224, 230, which produce outputs D2, D3, is that D1 indicates the presence of the total signal at the input of the receiver, both wanted and unwanted blocker signals, while D2/D3 indicate the amount of wanted signal only since they are connected after the output of the filters 214 and 216, which filter out the unwanted blocker signals.

Based on the indication of the above detectors, the bias of the various blocks of the receiver may be adjusted in order to have enough performance only when needed by reception conditions. When a strong input blocker signal is present, good linearity is necessary for the LNA 202, mixers 204 and 206, PGAs 210 and 212 and filters 214, 216 since this blocker is present everywhere in the signal path before it is filtered out by the filters 214 and 216. In order to improve linearity, bias has to be increased more for the blocks at the end of the receive chain, for example, PGAs 218 and 220, and filters 214 and 216. Similarly, when the wanted signal is very weak, good noise factor (NF) is necessary in which case the bias for the LNA 202 has to be increased. When a blocker signal is not present or the wanted signal is not very small, then the bias may be decreased.

Table 1 illustrates a mechanism for controlling the bias of each of the plurality of cells based on the RF power measurements to reduce the power consumption of the single chip dual-band RF receiver 140a.

Referring to Table 1, in Case 1, when the RF power measurement D1 at the output of the LNA with variable bias 202 is low, the measurement D2 and/or D3 are low, the blocker signal is not present and the wanted signal is weak, a good noise factor (NF) is required. In this case, to reduce the power consumption of the single chip dual-band RF receiver 140a, the variable bias A of the LNA 202 is set to a high value, in order to achieve good NF, the variable bias B of the plurality of mixers 204 and 206 and the variable bias C of the local oscillator 208 are set to a moderate value, the variable bias D of the plurality of PGAs 210 and 212 are set to a low value, the variable bias E of the plurality of filters 214 and 216 are set to a low value, and the variable bias F of the plurality of PGAs 218 and 220 are set to a low value.

In Case 2, when the RF power measurement D1 at the output of the LNA with variable bias 202 is moderate, the measurement D2 and/or D3 is moderate, the blocker signal is not present and the wanted signal is moderate to strong, neither good linearity nor good NF are required. In this case, to reduce the power consumption of the single chip dual-band RF receiver 140a, the variable bias A of the LNA 202 is set to a low value, the variable bias B of the plurality of mixers 204 and 206 and the variable bias C of the local oscillator 208 are set to a low value, the variable bias D of the plurality of PGAs 210 and 212 are set to a low value, the variable bias E of the plurality of filters 214 and 216 are set to a low value, and the variable bias F of the plurality of PGAs 218 and 220 are set to a low value.

In Case 3, when the RF power measurement D1 at the output of the LNA with variable bias 202 is high, the measurement D2 and/or D3 is high, the blocker signal is probably large and the wanted signal is also large, moderately good linearity is required. In this case, to reduce the power consumption of the single chip dual-band RF receiver 140a, the variable bias A of the LNA 202 is set to a low value, the variable bias B of the plurality of mixers 204 and 206 and the variable bias C of the local oscillator 208 are set to a moderate value, the variable bias D of the plurality of PGAs 210 and 212 are set to a high value, the variable bias E of the plurality of filters 214 and 216 are set to a high value, and the variable bias F of the plurality of PGAs 218 and 220 are set to a high value.

In Case 4, when the RF power measurement D1 at the output of the LNA with variable bias 202 is high, the measurement D2 and/or D3 is low, the blocker signal is large and the RF signal is weak. In this case, the single chip dual-band RF receiver 140a achieves both good NF and linearity, by setting the variable bias A of the LNA 202 to a high value, the variable bias B of the plurality of mixers 204 and 206 and the variable bias C of the local oscillator 208 are set to a high value. The variable bias D of the plurality of PGAs 210 and 212 are set to a high value, the variable bias E of the plurality

TABLE 1

| Case | D1 | D2 and/or D3 | Blocker Signal | Wanted signal | A | B | C | D | E | F |
|---|---|---|---|---|---|---|---|---|---|---|
| 1 | Low | Low | No | Weak | High | Moderate | Moderate | Low | Low | Low |
| 2 | Low | Moderate or High | No | Moderate | Low | Low | Low | Low | Low | Low |
| 3 | High | High | Large/does not matter | Strong | Low | Moderate | Moderate | High | High | High |
| 4 | High | Low | Large | Weak | High | High | High | High | High | High | of filters 214 and 216 are set to a high value, and the variable bias F of the plurality of PGAs 218 and 220 are set to a high value.

Figure 3:
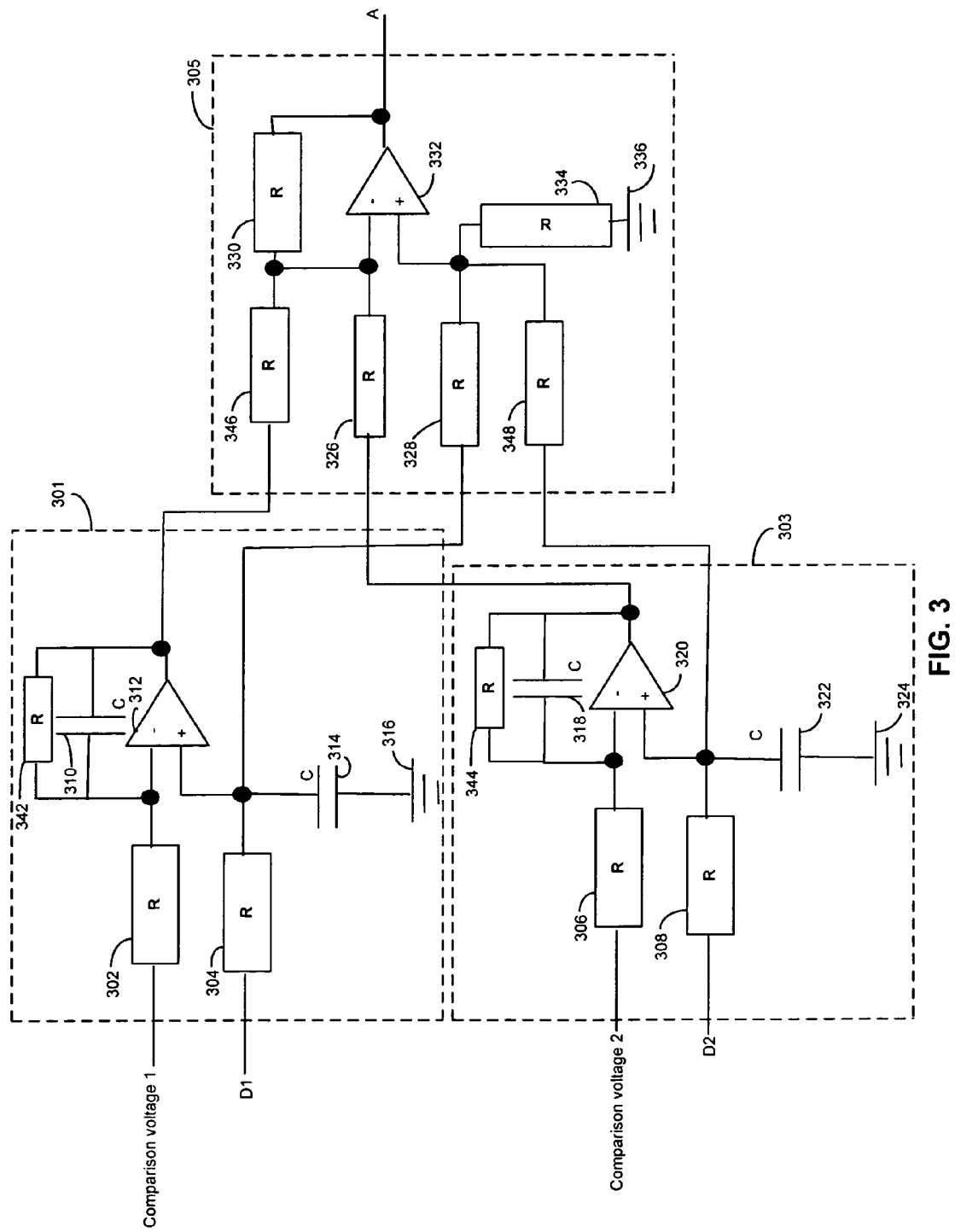
FIG. 3 is a block diagram illustrating implementation of a programmable biasing mechanism utilizing a plurality of operational amplifiers (op-amps), in accordance with an embodiment of the invention.

FIG. 3 is a block diagram illustrating implementation of an analog programmable biasing mechanism utilizing a plurality of operational amplifiers (op-amps), in accordance with an embodiment of the invention. Referring to FIG. 3, there is shown an analog variable biasing mechanism 300. The analog variable biasing mechanism 300 comprises a plurality of filters 301 and 303, and a differential amplifier with multiple inputs 305. The bias may also be adjusted by digitally programming the bias of each block if the baseband processor or processor can read measurements D1 and D3, by digitizing those signals by using ADCs.

The filter 301 comprises a plurality of resistors, R 302, R 342 and R 304, a plurality of capacitors C 310 and C 314, an operational amplifier (op-amp) 312 and a ground (GND) 316. The filter 303 comprises a plurality of resistors, R 306, R 344 and R 308, a plurality of capacitors C 318 and C 322, an op-amp 320 and GND 324. The differential amplifier 305 comprises a plurality of resistors 326, 328, 330, 346, 348, and 334, an op-amp 332, and GND 336.

The comparison voltage 1 is a DC voltage and its value may depend on the characteristics of the detector 222. If measured RF power output D1 becomes higher that the comparison voltage 1, indicating that the RF signal at the output of the LNA 202 is high, the output of the op amp 312 becomes high. The output of the op amp 312 may vary in accordance to the variations of the measured RF power output D1, the comparison voltage 1, the value of resistors 302, 304, 342 and the value of the capacitors 310 and 314. The capacitors 310 and 314 may be enabled to control the delay characteristics of the circuit. The output voltage of op amp 312 and the voltage at the non-inverting input of op amp 312 are input to the differential amplifier 305.

The comparison voltage 2 is a DC voltage and its value may depend on the characteristics of the detector 222. If the measured low frequency voltage D2 becomes higher that the comparison voltage 2, indicating that the RF signal at the output of the filter 216 is high, the output of the op amp 320 becomes high. The output of the op amp 320 may vary in accordance to the variations of the measured low frequency voltage D2, the comparison voltage 2, the value of resistors 306, 308, 344, and the value of the capacitors 318 and 322. The capacitors 310 and 314 may be enabled to control the delay characteristics of the circuit. The output voltage of op amp 320 and the voltage at the non-inverting input of 320 are input to the differential amplifier 305. The values of the resistors 326, 328, 330, 334, 342, 344 are selected to produce bias voltage A in accordance to Table 1.

Figure 4:
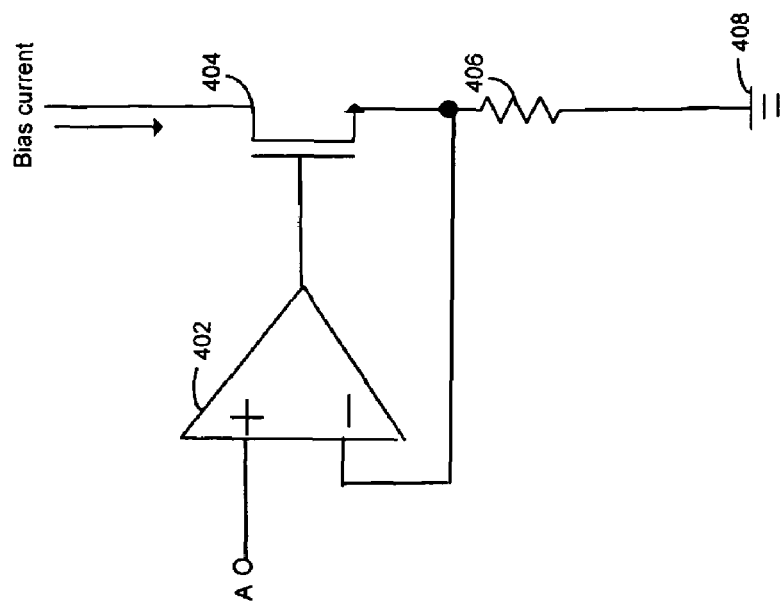
FIG. 4 is a block diagram illustrating implementation of a programmable biasing mechanism utilizing an analog biasing configuration, in accordance with an embodiment of the invention.

FIG. 4 is a block diagram illustrating implementation of a programmable biasing mechanism utilizing an analog-biasing configuration, in accordance with an embodiment of the invention. Referring to FIG. 4, there is shown an op-amp 402, a NMOS transistor 404, a resistor 406 and GND 408. The bias current flowing through the NMOS transistor 404 may be controlled by varying the input voltage A to the op-amp 402.

In operation, increasing the input voltage A to the positive input of the op-amp 402 causes the differential output of the op-amp 402 to increase. This increases the gate voltage of the transistor 404, increasing the biasing current and the source voltage of the transistor 404 across the resistor 406. As the source voltage of the transistor 404 is fed back to the negative input of the op-amp 402, an increase in the output voltage of the transistor 404 reduces the difference in the differential input of the op-amp 402. This further reduces the differential output of the op-amp 402. This process continues until the input voltage A and the bias current reaches steady state. In steady state the current that flows through resistor 406, which is almost equal to the bias current since gate current is almost zero may be defined by voltage A and resistor 406.

Figure 5:
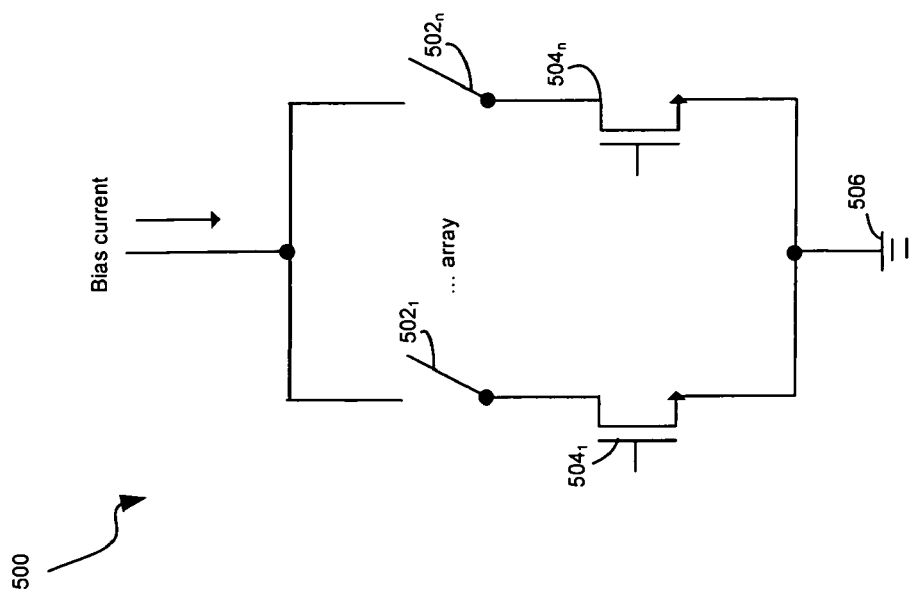
FIG. 5 is a block diagram illustrating an exemplary implementation of a programmable biasing mechanism utilizing a digital biasing configuration, in accordance with an embodiment of the invention.

FIG. 5 is a block diagram illustrating an exemplary implementation of a programmable biasing mechanism utilizing a digital biasing configuration, in accordance with an embodiment of the invention. Referring to FIG. 5, there is shown a portion of a current mirror circuit 500. The portion of the current mirror 500 comprises a plurality of switches $502_{1\ldots n}$, a plurality of transistors $504_{1\ldots n}$ and a GND 506. In operation, the bias current flowing through any of the transistors $504_{1\ldots n}$ may be digitally controlled by opening or closing of any of the switches $502_{1\ldots n}$ respectively. The switches $502_{1\ldots n}$ may be implemented using NMOS, PMOS or combinations of both transistors. This mechanism may be utilized when signals D1, D3 are digital. A baseband processor, or software running on the baseband processor, or a processor may be used for programming.

Figure 6:
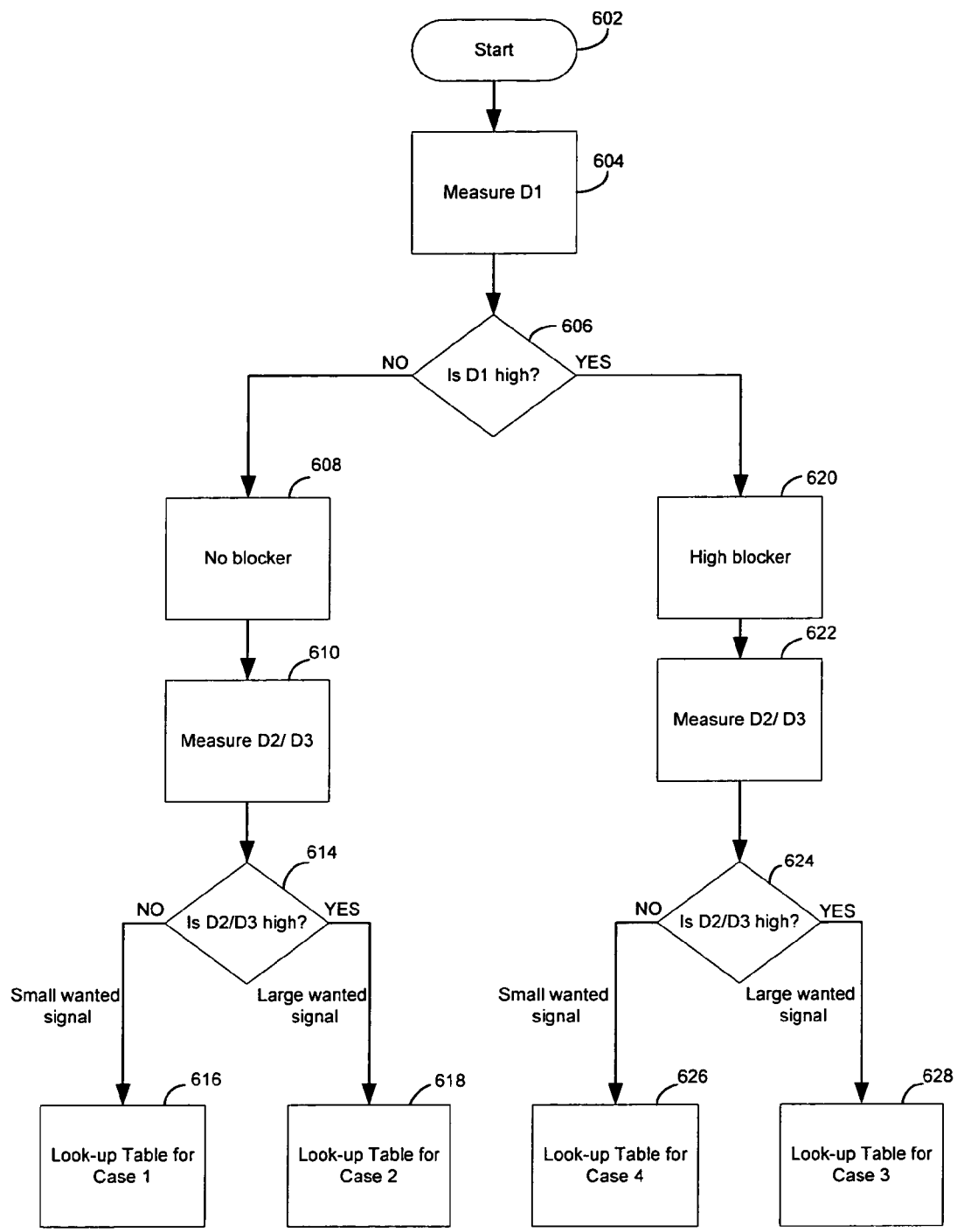
FIG. 6 is a flow chart illustrating a programmable biasing mechanism for a mobile digital television environment, in accordance with an embodiment of the invention.

FIG. 6 is a flow chart illustrating a programmable biasing mechanism for mobile digital television environment, in accordance with an embodiment of the invention. Referring to FIG. 6, exemplary steps may begin at step 602. In step 604, the RF power output D1 of the LNA 202 is measured. In step 606, it may be determined whether the measured RF power output value D1 is high. If the measured RF power output value D1 is low, control passes to step 608. In step 608, no blocker signal may be determined. In step 610, the measurement D2 and/or D3 may be measured. In step 614, it may be determined whether the measurement D2 and/or D3 is high. If the measurement D2 and/or D3 is low, control passes to step 616. In step 616, a small wanted signal is present and the bias of each of the cells may be set or controlled according to Case 1 in Table 1 to reduce the power consumption of the single chip dual-band RF receiver 140a (FIG. 1C). In step 614, if the measurement D2 and/or D3 is high or moderate, control passes to step 618. In step 618, a moderate RF signal is required and the bias of each of the components may be set or controlled according to Case 2 in Table 1 to reduce the power consumption of the single chip dual-band RF receiver 140a.

If in step 606, the measured RF power output value D1 is high, control passes to step 620. In step 620, a large blocker signal may be determined. In step 622, signals D2 and/or D3 may be measured. In step 624, it may be determined whether measurement D2 and/or D3 is high. If measurement D2 and/or D3 is low, control passes to step 626. In step 626, a small wanted signal is required along with the presence of a large blocker signal and the bias of each of the cells may be set or controlled according to Case 4 in Table 1 to adjust the power consumption of the single chip dual-band RF receiver 140a (FIG. 1C). In step 624, if measurement D2 and/or D3 is high, control passes to step 628. In step 628, a large wanted signal is required, possibly along with the presence of a large blocker signal and the bias of each of the components may be set or controlled according to Case 3 in Table 1 to reduce the power consumption of the single chip dual-band RF receiver 140a.

Certain aspects of the invention may provide a method and system for programmable biasing mechanism for mobile digital television environment. A single-chip multi-band radio frequency (RF) receiver 140a (FIG. 1C) may comprise circuitry that enables controlling of a bias of components within each of a plurality of radio frequency (RF) front-ends 201 that comprise low noise amplifiers (LNAs) 202 integrated within the single chip multi-band RF receiver 140a, and components within each of a plurality of baseband processors 203 integrated within the single chip multi-band RF receiver 140a. The controlling of the bias is based on signal power measurements within the integrated RF front-ends 201 and within the baseband processors 203, and each of the plurality of RF front-ends 201 handles processing of at least one of: a received UHF signal and a received L-band signal.

The single chip multi-band RF receiver 140a comprises circuitry that enables measuring within the single chip multi-band RF receiver 140a, RF signal power D1 at an output of each of the LNAs 20 in each of the plurality of RF front-ends 201. The single chip multi-band RF receiver 140a comprises circuitry that enables measuring within the single chip multi-band RF receiver 140a, low frequency voltage D2 at an output of at least a portion of each of the components, for example, filters 264 and 266 and PGA's 260, 262, 268, and 270, within each of the plurality of baseband processors 203. The single chip multi-band RF receiver 140a comprises circuitry that enables direct conversion of at least one of: the received UHF signal and the received L-band signal to a baseband signal. The single chip multi-band RF receiver 140a comprises circuitry that enables measuring within the single chip multi-band RF receiver 140a, signal strength, or the RSSI value D3 of the converted baseband signal.

The single chip multi-band RF receiver 140a comprises circuitry that enables determining if there is a blocker signal in at least one of the received UHF signal and the received L-band signal based on the signal power measurements D1, D2 and D3. The single chip multi-band RF receiver 140a comprises circuitry that enables controlling of the bias of at least one of: the LNA 202, a mixer 204 and/or 206, a local oscillator 208, a programmable gain amplifier (PGA) 210, 212, 218, and/or 220 and a filter 214 and/or 216 integrated within the single chip multi-band RF receiver 140a based on determining if there is a blocking signal.

The single chip multi-band RF receiver 140a comprises circuitry that enables decreasing of the bias A of the LNA 202, if the determined blocker signal is below a first threshold value, or is not present and at least one of: the received UHF signal and the received L-band signal is below a second threshold value, or is a weak signal. The single chip multi-band RF receiver 140a comprises circuitry that enables increasing of the bias A of the LNA 202, if the determined blocker signal is below a first threshold value, or is not present and at least one of: the received UHF signal and the received L-band signal is above a second threshold value, or is a strong signal. The single chip multi-band RF receiver 140a comprises circuitry that enables decreasing of the bias A of the LNA 202, if the determined blocker signal is above a first threshold value, or is a strong signal and at least one of: the received UHF signal and the received L-band signal is above a second threshold value, or is a strong signal. The single chip multi-band RF receiver 140a comprises circuitry that enables increasing of the bias A of the LNA 202, if the determined blocker signal is above a first threshold value, or is a strong signal and at least one of: the received UHF signal and the received L-band signal is below a second threshold value, or is a weak signal.

The single chip multi-band RF receiver 140a comprises circuitry that enables controlling of the bias of the components within each of the plurality of radio frequency (RF) front-ends 201 that comprise low noise amplifiers (LNAs) 202 integrated within the single chip multi-band RF receiver 140a, and components within each of the plurality of baseband processors 203 integrated within the single chip multi-band RF receiver 140a by utilizing an analog biasing configuration as illustrated in FIG. 3. The single chip multi-band RF receiver 140a comprises circuitry that enables controlling of the bias of the components within each of the plurality of radio frequency (RF) front-ends 201 that comprise low noise amplifiers (LNAs) 202 integrated within the single chip multi-band RF receiver 140a, and components within each of the plurality of baseband processors 203 integrated within the single chip multi-band RF receiver 140a by utilizing a digital biasing configuration as illustrated in FIG. 5.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
controlling a bias of components within each of a plurality of radio frequency (RF) front-ends integrated within a single chip multi-band RF receiver; and
controlling said bias of components within each of a plurality of baseband processors integrated within said single chip multi-band RF receiver, wherein said controlling is based on comparing signal power measurements within said RF front-ends and within said baseband processors with a threshold value, and each of said plurality of RF front-ends handles processing of one or both of: a received UHF signal and/or a received L-band signal.

2. The method according to claim 1, comprising measuring within said single chip multi-band RF receiver, RF signal power at an output of each low noise amplifier (LNA) in each of said plurality of RF front-ends.

3. The method according to claim 1, comprising measuring within said single chip multi-band RF receiver, low frequency voltage at an output of at least a portion of each of said components within each of said plurality of baseband processors.

4. The method according to claim 1, comprising directly converting one or both of: said received UHF signal and/or said received L-band signal to a baseband signal within said single chip multi-band RF receiver.

5. The method according to claim 4, comprising measuring within said single chip multi-band RF receiver, signal strength of said converted baseband signal.

6. The method according to claim 5, comprising determining if there is a blocker signal in one or both of: said received UHF signal and/or said received L-band signal based on said signal power measurements.

7. The method according to claim 6, comprising controlling said bias of one or more of: a low noise amplifier (LNA), a mixer, a local oscillator, a programmable gain amplifier (PGA) and/or a filter integrated within said single chip multi-band RF receiver based on said determining.

8. The method according to claim 6, comprising decreasing said bias of at least one low noise amplifier (LNA), if said determined blocker signal is below a first threshold value and one or both of: said received UHF signal and/or said received L-band signal is below a second threshold value.

9. The method according to claim 6, comprising increasing said bias of at least one low noise amplifier (LNA), if said determined blocker signal is below a first threshold value and one or both of: said received UHF signal and/or said received L-band signal is above a second threshold value.

10. The method according to claim 6, comprising decreasing said bias of at least one low noise amplifier (LNA), if said determined blocker signal is above a first threshold value and one or both of: said received UHF signal and/or said received L-band signal is above a second threshold value.

11. The method according to claim 6, comprising increasing said bias of at least one low noise amplifier (LNA), if said determined blocker signal is above a first threshold value and one or both of: said received UHF signal and/or said received L-band signal is below a second threshold value.

12. The method according to claim 1, comprising controlling said bias of said components within each of said plurality of radio frequency (RF) front-ends integrated within said single chip multi-band RF receiver, and said bias of said components within each of said plurality of baseband processors integrated within said single chip multi-band RF receiver by utilizing an analog biasing configuration.

13. The method according to claim 1, comprising controlling said bias of said components within each of said plurality of radio frequency (RF) front-ends integrated within said single chip multi-band RF receiver, and said bias of said components within each of said plurality of baseband processors integrated within said single chip multi-band RF receiver by utilizing a digital biasing configuration.

14. A system for processing signals in a communication system, the system comprising:
one or more circuits within a single chip multi-band RF receiver that are operable to control a bias of components within each of a plurality of radio frequency (RF) front-ends integrated within said single chip multi-band RF receiver; and
said one or more circuits are operable to control said bias of components within each of a plurality of baseband processors integrated within said single chip multi-band RF receiver, wherein said controlling is based on comparing signal power measurements within said RF front-ends and within said baseband processors with a threshold value, and each of said plurality of RF front-ends handles processing of one or both of: a received UHF signal and/or a received L-band signal.

15. The system according to claim 14, wherein said one or more circuits are operable to measure within said single chip multi-band RF receiver, RF signal power at an output of each low noise amplifier (LNA) in each of said plurality of RF front-ends.

16. The system according to claim 14, wherein said one or more circuits are operable to measure within said single chip multi-band RF receiver, low frequency voltage at an output of at least a portion of each of said components within each of said plurality of baseband processors.

17. The system according to claim 14, wherein said one or more circuits are operable to directly convert one or both of: said received UHF signal and/or said received L-band signal to a baseband signal.

18. The system according to claim 17, wherein said one or more circuits are operable to measure within said single chip multi-band RF receiver, signal strength of said converted baseband signal.

19. The system according to claim 18, wherein said one or more circuits are operable to determine if there is a blocker signal in one or both of: said received UHF signal and/or said received L-band signal based on said signal power measurements.

20. The system according to claim 19, wherein said one or more circuits are operable to control said bias of one or more of: a low noise amplifier (LNA), a mixer, a local oscillator, a programmable gain amplifier (PGA) and/or a filter integrated within said single chip multi-band RF receiver based on said determining.

21. The system according to claim 19, wherein said one or more circuits are operable to decrease said bias of at least one low noise amplifier (LNA), if said determined blocker signal is below a first threshold value and one or both of: said received UHF signal and/or said received L-band signal is below a second threshold value.

22. The system according to claim 19, wherein said one or more circuits are operable to increase said bias of at least one low noise amplifier (LNA), if said determined blocker signal is below a first threshold value and one or both of: said received UHF signal and/or said received L-band signal is above a second threshold value.

23. The system according to claim 19, wherein said one or more circuits are operable to decrease said bias of at least one low noise amplifier (LNA), if said determined blocker signal is above a first threshold value and one or both of: said received UHF signal and/or said received L-band signal is above a second threshold value.

24. The system according to claim 19, wherein said one or more circuits are operable to increase said bias of at least one low noise amplifier (LNA), if said determined blocker signal is above a first threshold value and one or both of: said received UHF signal and/or said received L-band signal is below a second threshold value.

25. The system according to claim 14, wherein said one or more circuits are operable to control said bias of said components within each of said plurality of radio frequency (RF) front-ends integrated within said single chip multi-band RF receiver, and said bias of said components within each of said plurality of baseband processors integrated within said single chip multi-band RF receiver by utilizing an analog biasing configuration.

26. The system according to claim 14, wherein said one or more circuits are operable to control said bias of said components within each of said plurality of radio frequency (RF) front-ends integrated within said single chip multi-band RF receiver, and said bias of said components within each of said plurality of baseband processors integrated within said single chip multi-band RF receiver by utilizing a digital biasing configuration.

* * * * *